United States Patent [19]

Dean, II et al.

[11] Patent Number: 4,831,393

[45] Date of Patent: May 16, 1989

[54] BELT AND BELT SUPPORT FOR NON-IMPACT, DIRECT CHARGE ELECTROGRAPHIC PRINTER

[75] Inventors: Walter C. Dean, II, Simsbury; Richard J. Coburn, West Hartford, both of Conn.; Thomas D. Kegelman, Palm Harbor, Fla.

[73] Assignee: Moore Business Forms, Inc., Grand Island, N.Y.

[21] Appl. No.: 131,828

[22] Filed: Dec. 11, 1987

[51] Int. Cl.[4] .............................................. G01D 15/00

[52] U.S. Cl. ................................ 346/160.1; 346/153.1

[58] Field of Search .......................... 355/3 TR, 3 BE; 346/153.1, 155, 160.1, 139 A, 150; 400/119; 101/DIG. 13; 358/300

[56] References Cited

U.S. PATENT DOCUMENTS

| | | | |
|---|---|---|---|
| 3,615,414 | 3/1971 | Light | 346/153.1 |
| 4,156,245 | 5/1979 | Inoue et al. | 346/153.1 |
| 4,264,912 | 1/1981 | Coburn et al. | 346/153.1 |
| 4,423,354 | 4/1983 | Kegelman | 346/153.1 |
| 4,638,339 | 8/1987 | Coburn et al. | 346/153.1 |
| 4,642,661 | 1/1987 | Dean | 346/153.1 |
| 4,651,605 | 2/1987 | Dean | 346/153.1 |
| 4,714,939 | 12/1987 | Ahern et al. | 355/3 TR |

*Primary Examiner*—Arthur G. Evans
*Attorney, Agent, or Firm*—Nixon & Vanderhye

[57] ABSTRACT

An endless loop multi layered belt for an electrographic printer is supported on a plurality of rollers and driven by sprocket holes along one belt edge, the belt having coextensive conductive and charge receiving layers. Another embodiment provides a conductive endless strip along the other lateral edge to maintain electrical contact with the conductive layer and a further embodiment provides support for the belt system.

16 Claims, 4 Drawing Sheets

FIG. 2
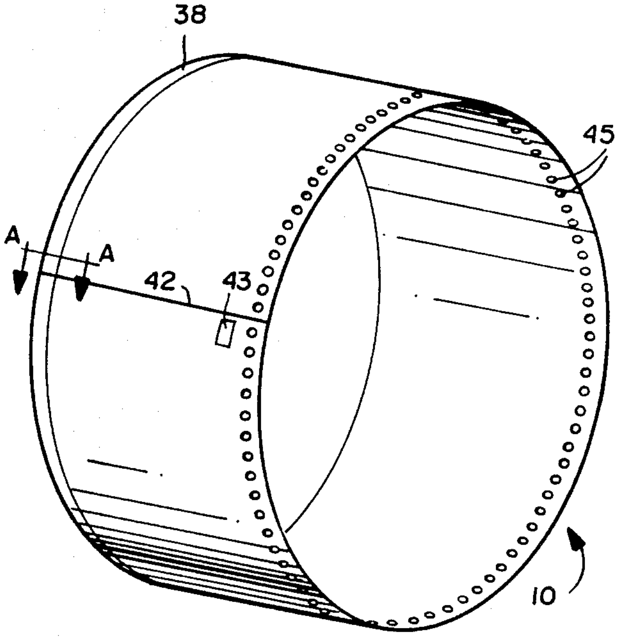
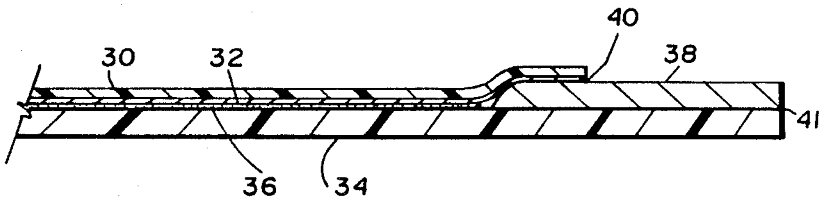
FIG. 3

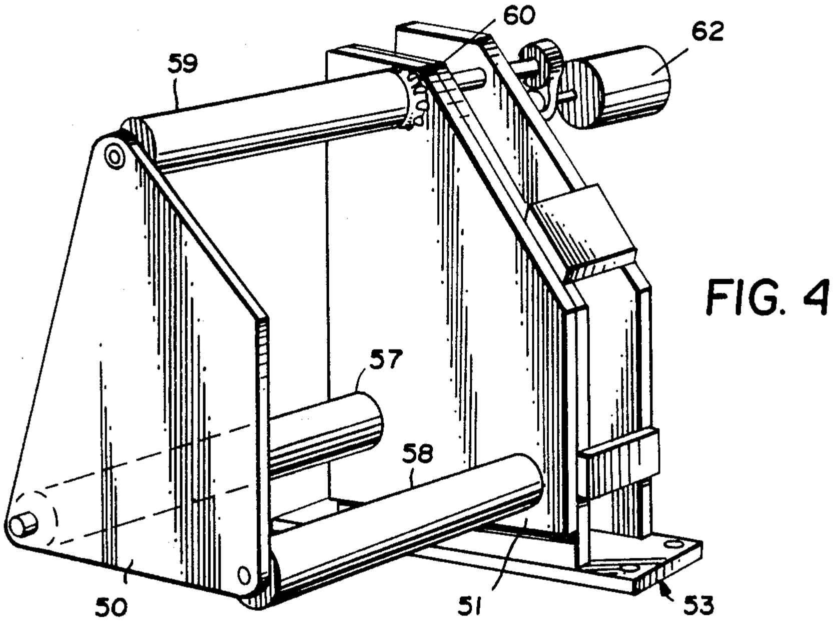
FIG. 4
FIG. 5
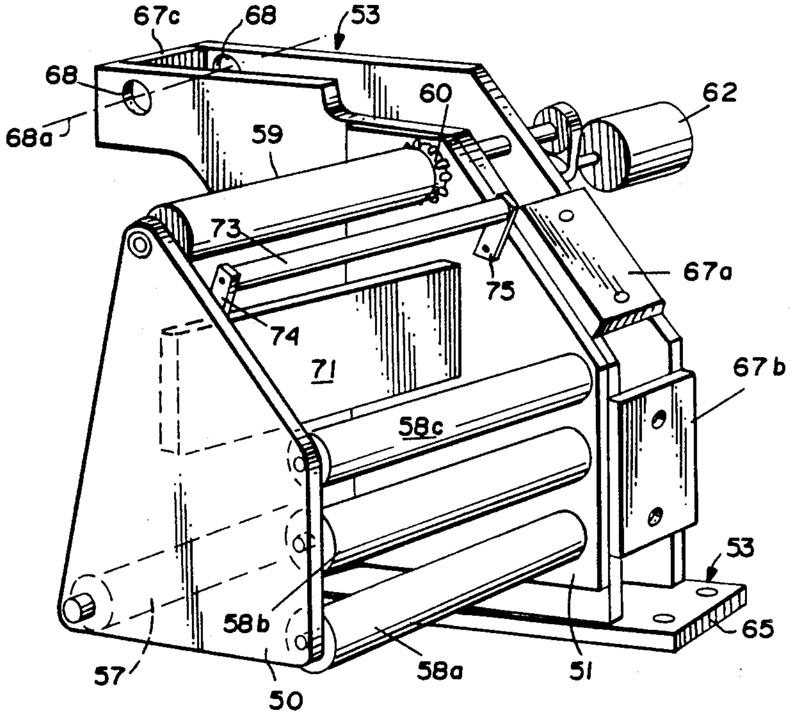

BELT AND BELT SUPPORT FOR NON-IMPACT, DIRECT CHARGE ELECTROGRAPHIC PRINTER

FIELD OF THE INVENTION

This invention generally relates to direct charge deposition electrographic printing apparatus using a movable dielectric belt and is more particularly directed to the construction of such a belt and its drive and support mechanism.

BACKGROUND OF THE INVENTION

Non-impact electrographic printers generally use a dielectric surface to receive an electrostatic charge to form a latent image of the information that is desired to be printed; that latent image is, in accordance with known techniques, developed with a suitable toner and transferred to paper on which the image is thereafter fixed, as by heat. The electrostatic surface on which the latent image is formed is most often a moving dielectric surface on which electrostatic information is provided by a print head, and such a general combination can be found in U.S. Pat. No. 4,638,339 entitled "Electrographic Charge Deposition Apparatus" and assigned to the assignee of the present invention.

It is customary for non-impact printers to rely upon a recirculating charge receiving surface to carry the desired image through the various parts of the printing process. Laser and other optical printers generally use a photo sensitive material as the charge receiving surface whereas charge deposition systems need to cooperate with a dielectric material such as the surface of a rotating drum which has been coated with the necessary dielectric material. However, such a drum technique includes a surface that is subjected to wear and therefore replacement and, because such drums are precisely machined elements, the cost of replacing such drums can add significantly to the per sheet cost of the printed material.

An additional prior art technique is the use of a thin flexible belt of an appropriate material to carry the working dielectric surface through the system. However, the motion of the belt is exceedingly difficult to control and the belt transport system often becomes even more complex and expensive than the drum system. Attempts have been made to combine the belt and drum system by wrapping a belt around the outside of the drum and attempts have been made to correct the belt path problems by mounting the belt between elements such as bars and chains to overcome any belt forces which tend to cause the belt to go off track. Clearly avoiding any interrupted print cycle technique or discontinuous paper motion that results from using a discontinuous belt is to be desired but the provision of complex corrective belt tracking systems must be avoided to maintain the desired low cost in the cost per sheet printed.

OBJECTS OF THE INVENTION

It is a principal object of this invention to provide an improved flexible belt construction providing an electrostatic charge receiving surface for use in a direct charge deposition electrographic printing apparatus.

It is a further object of this invention to provide a flexible belt having a dielectric charge receiving surface which belt construction and support minimizes tracking problems as that belt is moved during the printing process.

It is an additional object of this invention to provide simplified belt construction including at least one conductive layer, an electrostatic charge receiving surface and means for establishing electrical contact with the conductive layer during the printing process.

It is a still further object of this invention to provide low cost drive and support system for the moving belt of an electrographic printer using direct charge deposition for imaging.

It is yet another object of this invention to provide support apparatus for a dielectric charge receiving belt which apparatus permits facile removal and replacement of the belt without disturbing associated electrographic printing apparatus.

Other objects will be in part obvious and in part pointed out in more detail hereinafter.

A better understanding of the objects, advantages, features, properties and relations of the invention will be obtained from the following detailed description and accompanying drawings which set forth certain illustrative embodiments and are indicative of the ways in which the principles of the invention are employed.

SUMMARY OF THE INVENTION

The present invention provides an endless loop multilayered flexible belt having a dielectric charge receiving surface, a coextensive conductive layer, support material as desired and sprocket drive means to provide belt movement while maintaining alignment as the belt passes over a plurality of support rollers. Additionally, the sprocket holes in the belt can be provided along one edge and continuous electrical contact with the conductive layer can be provided along the other. Included in the invention is support and drive apparatus uniquely suited to the described belt construction.

BRIEF DESCRIPTION OF THE DRAWINGS

FIG. 2 is a schematic drawing of a preferred embodiment of the belt of this invention;

FIG. 3 is a cross section of the belt taken at the point A.A of FIG. 2;

FIG. 4 is an illustration of a simplified belt support and drive;

FIG. 5 is a perspective view of an alternative belt support; and

DETAILED DESCRIPTION OF THE INVENTION

Figure 1:
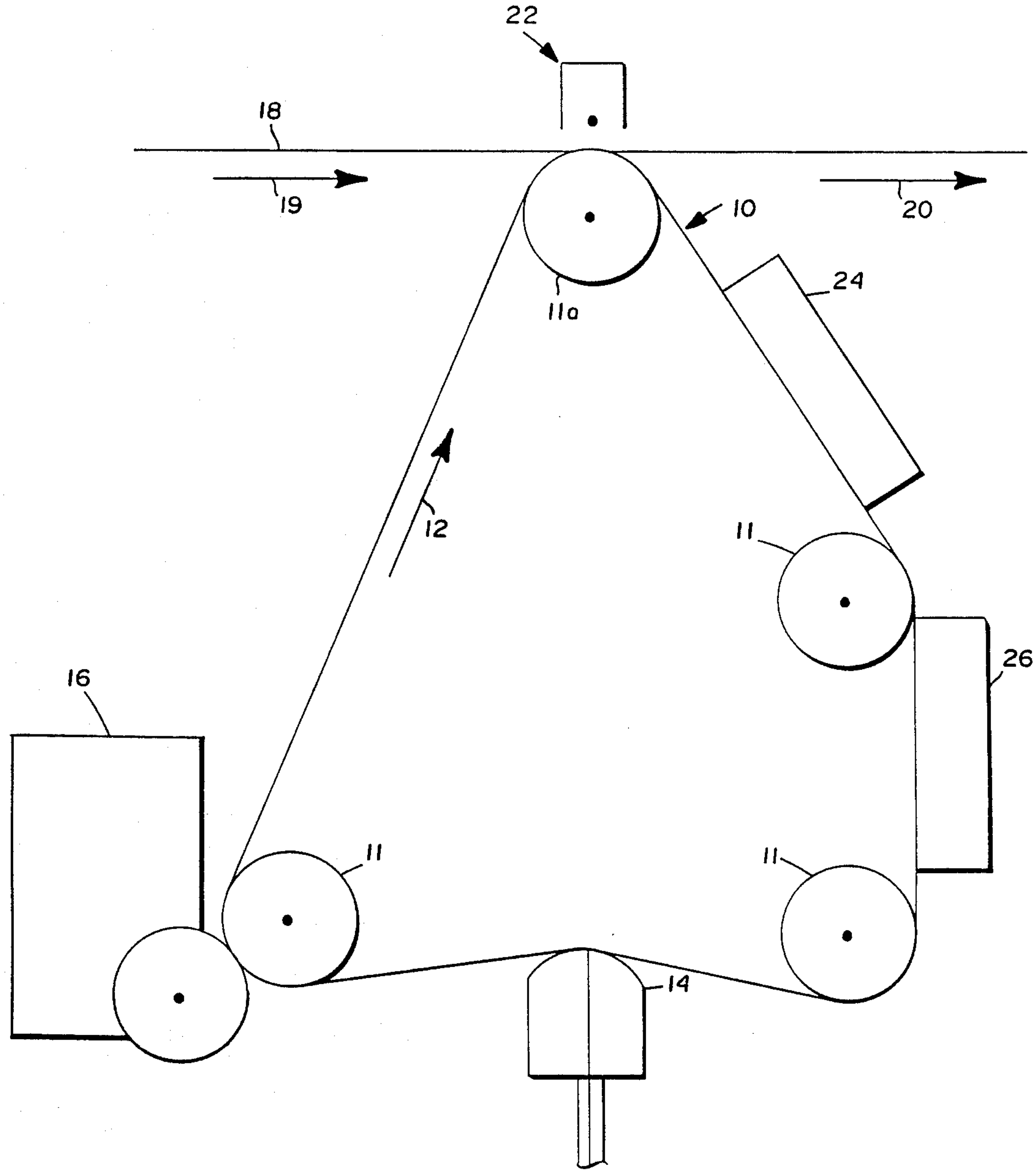
FIG. 1 schematically illustrates an electrographic printer including the apparatus of the present invention.

Turning first to FIG. 1 and the schematic illustration of non-impact printer including the present invention, belt 10 is supported on a plurality of rollers 11, one or more of which may be driven in accordance with an embodiment of this invention to produce movement of the belt 10 in the direction of arrow 12. The print head 14 of the preferred embodiment of this apparatus is preferably of the type disclosed in U.S. Pat. No. 4,638,339 issued Jan. 20, 1987 and assigned to the assignee of the present invention, which print head serves to create on dielectric belt 10 a latent electrostatic image in accordance with the voltages applied to the pins of print head 14.

Following conventional techniques, a suitable toner is supplied to belt 10 by developer apparatus generally designated 16, which toner is attracted in accordance with the electrostatic charge on belt 10. A continuous sheet of paper 18 is suitably driven in the direction of arrows 19 and 20 so as to pass roller 11a, which roller is directly opposite and supportive of belt 10 at transfer corona 22. After the image has been transferred to paper 18, the continues to cleaning station 24. Following such cleaning, dielectric belt 10 continues through conditioning station 26, to prepare dielectric belt 10 to receive the image from print head 14. In accordance with conventional techniques, the paper with the image transferred thereto by the transfer corona 22, continues to a suitable image fixing or fusing station (not shown) which apparatus can be constructed in accordance with U.S. Pat. No. 4,642,661 entitled "Printer with Drive on Swinging Platform" and assigned to the assignee of the present invention. By way of explanation, applicants use the term "corona" in a generic sense to refer to a fairly wide variety of commercially available corona discharge devices as well as devices which generate or product ions which characteristic of a corona. The specific details of the corona generation or production of ions is not an essential part of the invention and hence applicants use the generally accepted term "corona" in connection therewith.

Turning next to FIGS. 2 and 3, therein is disclosed an endless loop belt 10 comprised, in its preferred embodiment, of a plurality of laminated layers. As best seen in FIG. 3, a cross section at the point A—A of FIG. 2, a thin dielectric layer 30 is the charge receiving surface for the electrographic printer, which layer is a 0.00025 to 0.0005 inch thick Mylar polyester plaster element or other suitable dielectic material. The underside of Mylar layer 30 is provided with a vapor-deposited, aluminum layer of 100 to 300 angstroms thickness which aluminized layer is designated by the numeral 32. It is to be understood however that other conductive layers can be provided so long as the desired flexibility and durability can be obtained. The dielectric layer 30 with its conductive backing layer 32 is affixed to a suitable mechanical support layer 34 by an adhesive 36. Support layer 34 can, it self, be a plurality of layers formed from a suitable plastic intended to provide the desired strength for belt 10. It is also envisioned that the desired mechanical support can be provided as part of the conductive layer such as, for example, a conductive plastic. As support layer 34 is affixed to layers 30 and 32 by adhesive 36, a conductive strip 38 is also affixed to support layer 34 and electrically connected to the aluminized conductive layer 32 as seen at 40 and to the support layer 34 as at 41 to form a continuous conductive strip extending along one lateral edge of belt 10. In actual practice conductive strip 38 can be provided by a suitable conductive paint or such other technique as operating and manufacturing conditions may suggest.

In accordance with the preferred embodiment of the invention, the belt is formed into and endless loop and suitably joined at a seam 42 and provided with a "flag" or other indicia 43 so that the possible discontinuity appearing at joint 42 is visibly marked out, if desired, electronically marked thereby to avoid electrostatic printing that extends over the seam area.

Also in accordance with a preferred embodiment of this invention, a series of sprocket holes 45 extend through the belt 10 for the full length of the endless loop, which sprocket holes are appropriately spaced and positioned to cooperate with a sprocket in the drive mechanism associated with the belt in an electrographic printer.

Turning next to FIG. 4, there is illustrated a suitable simplified structure for use in driving and supporting belt 10, which structure generally comprises a pair of side plates 50 and 51 are supported in spaced relationship by support structure 53 (a suitable support structure for plate 50 as been amended for purposes of clarity) which side plates support rollers 57, 58 and 59, each of the rollers being suitably journaled and appropriate bearings for rotation. Support roller 59 is provided with sprocket 60 at one end thereof which sprocket cooperates with the holes 45 in belt 10 as seen in FIG. 2. Belt 10 has been omitted from FIG. 4 in the interest of providing clarity and ease of description relative to the simplicity of the belt mounting and drive system. Motor 62, of any suitable type, is appropriately connected to the axle supporting roller 59 so that it can be driven in accordance with the desired speed for belt 10 relative to the associated electrographic apparatus.

The multiple roller support for belt 10 serves to support belt 10 in the desired location with the sprocket 60 of roller 59 serving as the only drive for advancing belt 10 relative to the associated printing apparatus. By utilizing a drive sprocket that engages the holes 45 provided along one lateral edge of belt 10 it has been found that complex belt stearing mechanisms intended to maintain the accurate tracking of belt 10 can effectively be eliminated. Additionally, because contact with the aluminized layer 32 is necessary to provide the desired ground plane, a suitable roller (not shown) can be supported where desired to electrically engage the conductive strip 38.

Figure 6:
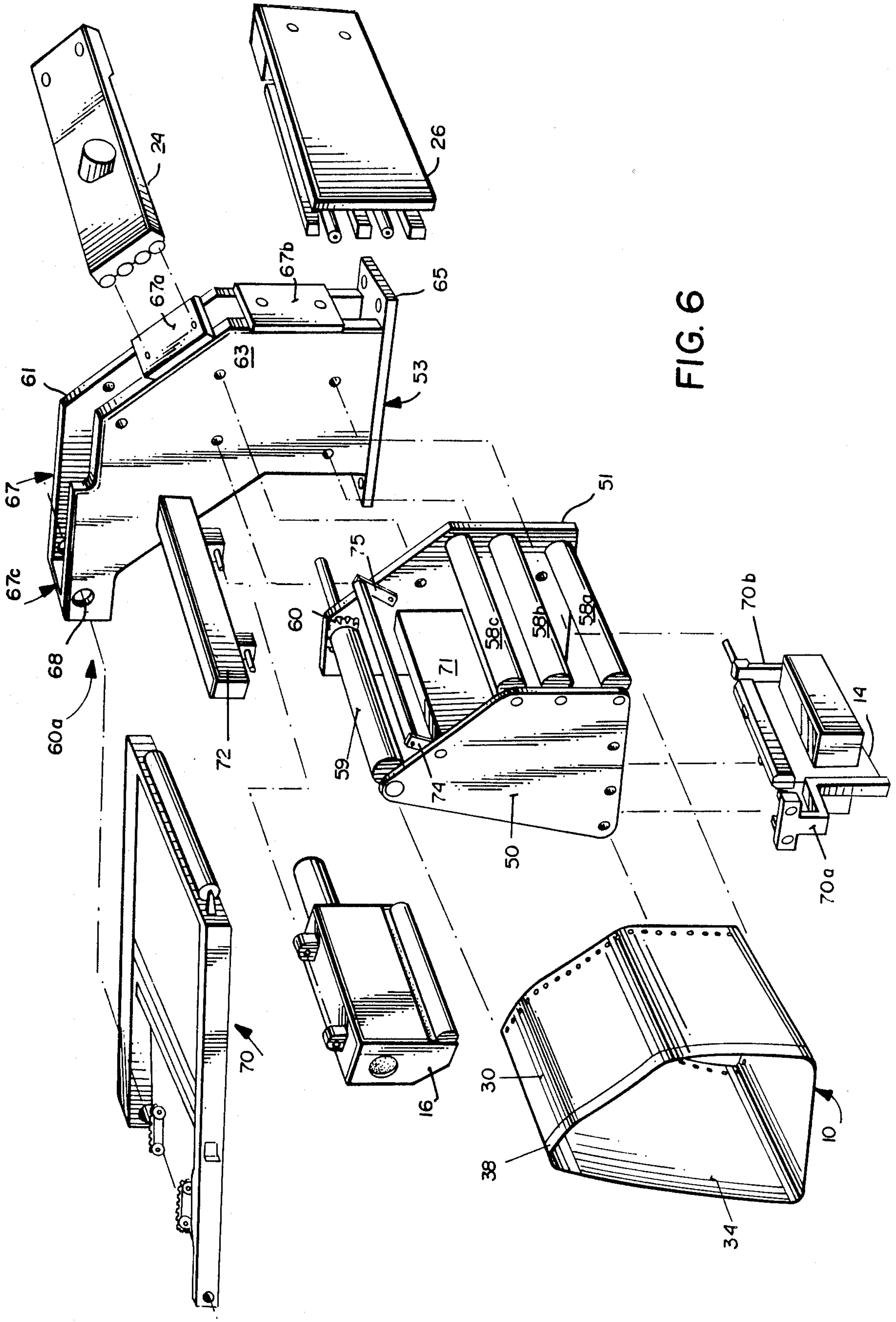
FIG. 6 is an exploded view of the support structure as generally shown in FIG. 5.

In accordance with the further feature of this invention, a modified belt support is shown in FIG. 5 and FIG. 6, which overall support structure not only maintains the advantage of multiple roller belt support with a sprocket drive along one edge but also provides a belt support structure which can be substantially open along one side thereby to permit facile installation and removal of belt 10, as may be necessary, without removal of components associated with the belt, which components require known careful positioning relative to the belt.

To be more specific, main frame 53 is comprised of spaced parallel mounting plates 61, 63, which, with base member 65 and intermediate support plates 67, define a rigid, box-like main cantilever support member from which associated apparatus is mounted. The aperture 68 and center line **68*a* provide the mounting pivot for a swinging paper feed path 70 such as that shown in U.S. Pat. No. 4,642,661 assigned to the assignee of the present invention. That swinging paper feed path is only one of a number of units forming and integral part of the electrographic printer of this invention. Additionally, cleaning station 24 is supported in a cantilever manner at mounting pad 67*a*, such a cleaning station being more fully disclosed in co-pending application Ser. No. 07/131,753 entitled "Cleaning System for Non-Impact Printer" and assigned to the assignee of the present invention. In a similar manner, a belt conditioning station 26 is mounted in cantilever fashion at mounting pad 67*b*, which belt conditioning system prepares the belt for direct charge deposition from print head 14**; such a conditioning station is more fully disclosed in co-pending application Ser. No. 07/131,928, entitled "Conditioning Apparatus for Non-Impact, Direct Charge Electrographic Printer Belt" and assigned to the assignee of this invention.

Box frame main support member 53 also serves to support side plate 51 of the roller support assembly, side plate 51 being affixed to support member 71. Member 71 is also rigidly secured at its opposite end to side plate 50. By so constructing and supporting side plates 50 and 51, a cantilever supporting frame supports a plurality of rollers 58*a*, 58*b* and 58*c* which are journaled for rotating support as is roller 57 and drive roller 59 which has sprocket 60 secured thereto in driving engagement with motor 62. With belt 10 in place and drivingly supported on the rollers, a tension control roller 73 is pivotally supported on arms 74 and 75, that roller being variably positioned to, under operating conditions, apply the desired amount of tension to belt 10 but to be adjustable to a position to release tension on belt 10 and provide slack to clear sprocket 60 thereby to permit easy removal of belt 10 from the belt support and drive roller assembly which is supported in a cantilever manner so as to create an "open throat design".

Certain portions of the electrographic apparatus may require different support techniques. Print head 14 is of the general type shown in U.S. Pat. No. 4,638,339 and it has been found to be desirable to use a pair of support arms 70*a*, 70*b* to rigidly support print head 14 relative to belt 10; hence, to remove belt 10 from its support driven assembly print head 14 must first be removed in the illustrated embodiment. However print head 14 may be secured in a cantilever manner to plate 51 if desired.

Developer station 16 is also supported in a cantilever fashion by support arm 72 which is rigidly affixed at its inboard end to plate 63 and to which the developer station is appropriately secured.

It is also noted that the positioning of the various support rollers can also be used to determine whether or not belt 10 is to be in a "free-span condition" as it would be at the print head 14, cleaning station 24, and at portions of belt conditioning station 26 all as described in those separate applications.

It is to be understood of course that the belt 10 which is supported by the rollers of FIGS. 5 and 6 has been omitted from FIG. 5 to facilitate understanding of that support and drive structure.

From the foregoing description and the drawings it will be readily apparent that we have developed a novel direct charge-receiving endless-loop belt for use in an electrographic printer together with a simplified belt drive system and an "open throat" cantilever roller belt support structure that facilitates accurate printer component mounting as well as easy belt removal.

As will be apparent to persons skilled in the art, various modifications, adaptations and variations of the foregoing specific disclosure can be made without departing from the teachings of this invention.

Having thus described the invention, what is claimed is:

1. In a non-impact direct charge deposition electrographic printer, a laminated, endless-loop belt for receiving an electrostatic charge from a print head comprising:

a flexible electrostatic charge receiving layer extending throughout the full length of the belt, and a conductive layer substantially coextensive with said charge receiving layer.

2. The electrographic printing apparatus of claim 1 and further comprising regularly spaced sprocket drive holes along one edge of the endless-loop belt, and wherein a support layer is provided next to said conductive layer and substantially coextensive therewith, said sprocket drive holes extending therethrough.

3. The electrographic printing apparatus of claim 2 wherein the support layer extends laterally beyond the charge receiving layer and the conductive layer in an area along an edge of the endless-loop belt opposite to the one edge containing the sprocket holes, and a conductive strip in electrical contact with the conductive layer is provided on said support layer in said area along the edge of the endless-loop belt.

4. The electrographic printing apparatus of claim 3 wherein the charge receiving layer is plastic the conductive layer is a metal vapor-deposited on the plastic, the support layer is plastic and the conductive strip is a conductive paint applied to the support layer.

5. The electrographic printing apparatus of claim 2 including means for supporting said endless-loop belt for movement along the length of the belt, said means for supporting including, a plurality of rollers, one of said rollers being provided with a drive sprocket having teeth adapted for engagement with the sprocket holes in said belt.

6. The electrographic printing apparatus of claim 5 wherein the drive sprocket is driven for rotation so as to move said belt.

7. The electrographic printing apparatus of claim 5 wherein means are provided for selectively placing said belt under tension.

8. The electrographic printing apparatus of claim 7 wherein a support frame is provided for said rollers and said frame is supported in a cantilever manner thereby to permit installation and removal of said belt from the unsupported side of said frame when said belt is not tensioned by said means for selectively placing said belt under tension.

9. The electrographic printing apparatus of claim 8 wherein the cantilever mounting for said frame also supports the apparatus associated with the cleaning and conditioning of said belt prior to direct deposition of an electrostatic charge from a print head.

10. The electrographic printing apparatus of claim 5 wherein a support frame is provided for said rollers and said frame is supported in a cantilever manner.

11. In a non-imact, direct charge deposition electrographic printer, a laminated, endless-loop belt for receiving an electrostatic charge from a print head, said belt provided along one edge with a plurality of sprocket drive holes, and means for supporting said endless-loop belt for movement along the length of the belt, said means for supporting including, a plurality of rollers, one of said rollers being provided with a drive sprocket having teeth adapted for engagement with the sprocket drive holes in said belt.

12. The electrographic printer of claim 11 wherein the drive sprocket is driven for rotation so as to move said belt.

13. The electrographic printer of claim 11 wherein means are provided for selectively placing said belt under tension.

14. The electrographic printer of claim 13 wherein a support frame is provided for said rollers and said frame is supported in a cantilever manner thereby to permit installation and removal of said belt from the unsupported side of said frame when said belt is not tensioned by said means for selectively placing said belt under tension.

15. The electrographic printer of claim 14 wherein the cantilever mounting for said frame also supports the apparatus associated with the cleaning and conditioning of said belt prior to direct deposition of an electrostatic charge from a print head.

16. The electrograhic printer of claim 11 wherein a support frame is provided for said rollers and said frame is supported in a cantilever manner.

* * * * *